United States Patent [19]

Berbner et al.

[11] Patent Number: 4,557,969
[45] Date of Patent: Dec. 10, 1985

[54] SHEET-LIKE PACKING MATERIAL OF MELAMINE OR PHENOL RESIN FIBERS

[75] Inventors: Heinz Berbner, Moerlenbach; Bernhard Seid, Frankenthal; Heinz Voelker, Limburgerhof; Hans D. Zettler, Gruenstadt, all of Fed. Rep. of Germany

[73] Assignee: BASF Aktiengesellschaft, Fed. Rep. of Germany

[21] Appl. No.: 672,636

[22] Filed: Nov. 19, 1984

[30] Foreign Application Priority Data

Nov. 17, 1983 [DE] Fed. Rep. of Germany ....... 3341461

[51] Int. Cl.$^4$ ............................................. D04H 1/58
[52] U.S. Cl. .................................. 428/283; 264/175; 428/281; 428/288
[58] Field of Search ...................... 428/281, 283, 288; 264/175

[56] References Cited

FOREIGN PATENT DOCUMENTS 1452629 2/1973 United Kingdom .

*Primary Examiner*—Marion E. McCamish
*Attorney, Agent, or Firm*—Keil & Weinkauf

[57] ABSTRACT

A sheet-like packing material consisting of
A. from 2 to 90% by weight of melamine resin or phenol resin fibers and/or fibrids,
B. from 5 to 90% by weight of finely divided inorganic fillers, preferably cement, and
C. from 2 to 40% by weight of organic binders, preferably rubber, with or without
D. from 0.1 to 50% by weight of thermoplastic fibrids, the percentages summing to 100, possesses low gas permeability, high compressive creep strength and advantageous compressibility, resilience and swelling behavior.

6 Claims, No Drawings

SHEET-LIKE PACKING MATERIAL OF MELAMINE OR PHENOL RESIN FIBERS

In order to provide a seal which is tight to liquids and gases, flat packings are employed. Packings of this type produced hitherto have generally been based on mixtures of asbestos fibers, inorganic fillers and rubber or polyisobutylene as a binder. Some of these materials are known and standardized under the name asbestos-rubber packing sheets, while another sheet-like packing material is usually known as cylinder head gasket material.

In the production of asbestos-rubber packings, the crude asbestos is first ground, shredded in a disintegrator and introduced into a viscous rubber solution in special stirred apparatuses, eg. kneaders. In general, the solution already contains the fillers. The actual manufacture of the sheet-like packing materials is carried out on calenders for producing asbestos-rubber sheets. In this procedure, the pasty asbestos-rubber material is shaped and compressed on the working roll until a particular layer thickness is obtained. By heating to 140°-160° C., the solvent evaporates and the hide becomes solid. A plurality of layers are combined, for example by crosswise lamination, to give the desired thickness, and the finished sheet is removed.

Cylinder head gaskets are manufactured as follows: first, asbestos is milled in water, and then aqueous binders and, if required, fillers, are added. This aqueous suspension is then processed further on a paper machine, for example a Fourdrinier machine, to give papers. The latter are dried and, if necessary, heated, after which conditioning is carried out.

Although such packings fulfil their technical function, the use of asbestos is decisively disadvantageous since it can constitute a danger to health during manufacture and processing of the sheets. For this intended use, attempts have therefore been made to replace the asbestos fibers with, for example, polymer fibers based on aromatic polyamides. The particular disadvantage of these materials is their high cost.

We have found that a composite material which consists of

A. from 2 to 90% by weight of melamine resin or phenol resin fibers and/or fibrids,
B. from 5 to 90% by weight of finely divided inorganic fillers, and
C. from 2 to 50% by weight of organic binders, with or without
D. from 0.1 to 50% by weight of thermoplastic fibrids, is very useful for the production of packings, the composite material having the following properties:
(a) the gas permeability according to DIN 3535 is less than 1.0, preferably less than 0.6, in particular from 0.05 to 0.1, cm$^3$/min,
(b) the compressive creep strength according to DIN 52,913 is greater than 10, preferably from 20 to 50, N/mm$^2$,
(c) the compressibility, according to ASTM F36 is from 3 to 25%,
(d) the resilience according to ASTM F36 is from 30 to 80% and
(e) the swelling according to ASTM F146 is less than 15%.

Although fibers of melamine resin or phenol resin possess less strength than those consisting of the aromatic polyamides used to date, the novel packing material surprisingly has a compressive creep strength and a compressibility which are similar to those of the conventional packing materials.

A. Because of their high thermal stability and non-flammability, melamine resin fibers are particularly suitable as a substitute for asbestos fibers. Their production and their properties have been disclosed, for example in British Pat. No. 1,452,629. They are preferably obtained from highly concentrated solutions of melamine/formaldehyde precondensates, by spinning, filament-drawing or extruding or by atomizing processes, for example using two-material nozzles. The resulting fibers are pre-dried and, if required, oriented, and the melamine resin is cured at 150° to 250° C. Advantageously, the fibers are provided with a size in order to improve adhesion. They are usually from 5 to 50 $\mu$m thick and from 1 to 100 mm long, and are present in the packing material in an amount of from 2 to 90, preferably from 5 to 50, % by weight. Their BET specific surface area is in general less than 2 m$^2$.g$^{-1}$.

The phenol resin fibers can be produced in the same way as the melamine resin fibers. The fibers are usually from 3 to 40 $\mu$m thick and from 1 to 100 mm long and are present in the packing material likewise in an amount of from 2 to 90, preferably from 5 to 50, % by weight.

The melamine resin or phenol resin fibers can be partially or completely replaced by fibrids consisting of these resins. Because of their branched structure, these fibrids give rise to better cohesion between the binder matrix and the reinforcing fibers. Fibrids are from 0.1 to 200, in particular from 0.5 to 50, mm long and less than 5, in particular from 0.01 to 0.5, $\mu$m thick, and have a BET specific surface area of not less than 5 m$^2$.g$^{-1}$.

B. Suitable fillers are finely divided inorganic substances, eg. cement, talc, kaolin, ground shale, ground quartz, lime, magnesia, barite, carbon black, kieselguhr and mixtures of these. They are present in amounts of from 5 to 90, preferably from 10 to 80, % by weight, and increase the long-term stability of the packings and prevent them from creeping under high load.

C. Suitable binders are conventional organic polymers in the form of an aqueous dispersion or a solution in an organic solvent, eg. toluene. Rubbers, eg. natural rubber, polybutadiene, nitrile rubber or polyisoprene, are preferred. For acid-resistant materials, polyisobutylene is used. In principle, it is also possible to use polyacrylates as well as phenol resins and melamine resins. They are present in an amount of from 2 to 50, preferably from 5 to 30, % by weight, and are responsible for cohesion of the components in the packing material.

D. The addition of thermoplastic fibrids results in good processability on the paper machine, since the fibrids possess a large specific surface area and are mat-forming. Furthermore, uniform distribution of the fillers and of the binder is achieved. Polymer fibrids are short fibers possessing sheet-forming properties. Examples of suitable thermoplastics are PVC, PS, PE, PP, PA, PAI, PET and PAN.

Fibrids have a branched structure. They are preferably from 0.1 to 200, in particular from 0.5 to 50, mm long and less than 5, in particular from 0.01 to 0.5, $\mu$m thick, the thickness meant being that of the fine individual fibers, determined microscopically at a magnification of 1:20,000.

They are generally produced by precipitation from a solution of the polymer, energy being supplied. Suitable preparation processes are described in, for example, DE-A No. 22 08 921, DE-A No. 23 26 143 and DE-A No. 25 16 563.

In a particular embodiment, mineralized fibrids are used, mineralization improving the thermal stability. Mineralized fibrids are prepared by precipitating suitable inorganic substances together with the polymer, as described in, for example, DE-A-32 25 708 and DE-A-33 44 462.

Preferred mineralized fibrids consist of a thermoplastic polymer modified with from 0.1 to 900, preferably from 1 to 100, % by weight of an oxide of a monovalent to tetravalent metal, silica or a silicate of a monovalent to trivalent metal.

Preferred modifying agents are calcium oxide, alumina, calcium silicate, silica, eg. in the form of Aerosil, cement, eg. in the form of Portland blast-furnace cement, sodium silicate, eg. in the form of waterglass, silanes, eg. methyltrichlorosilane, phenyltrichlorosilane or ethylpolysiloxane, silicon tetrachloride and the reaction product formed from cement or calcium oxide and silicon tetrachloride, which, for example, forms in situ in the polymer solution. The additives can be employed individually or as a mixture.

The modified fibrids possess the following properties:
(a) a Schopper-Riegler freeness of from 15° to 100°SR, preferably from 20° to 80°SR, and
(b) a BET specific surface area greater than 10 $m^2/g^{-1}$.

The Schopper-Riegler method is described in Korn-Burgstaller, Handbuch der Werkstoffprüfung, 2nd edition 1953, volume 4, Papier und Zellstoffprüfung, page 388 et seq., Springer Verlag. To carry out this determination, the fibrids have to be converted to an aqueous suspension having a constant stock consistency (2 g of fibrids per liter at 20° C.). The amount of water retained by the suspended fibrids under specific conditions is determined. The higher the fibrillation of the fibrids, the greater is the amount of water taken up. The Schopper-Riegler values for an unbeaten sulfite cellulose is from 12° to 15°SR.

The specific surface area was determined by the BET method by nitrogen adsorption (S. Brunauer, T. H. Emmett and E. Teller, J. Amer. Chem Soc. 60 (1938), 309) on fibrids which have been freeze-dried at −190° C.

The fibrids are present in the packing materials in amounts of from 0.1 to 50, preferably from 0.5 to 20, in particular from 1 to 15, % by weight.

The sheet-like packings can be produced by the methods which are also employed when asbestos is used. For example, the calender used for rubber-asbestos materials is employed for the production of materials resembling rubber-asbestos materials. Cylinder head gaskets are manufactured using, for example, Fourdrinier or cylinder machines.

In a preferred embodiment of the production of cylinder head gaskets, the components A, B and, if required, D, in the form of solids, and the component C, as an aqueous dispersion, are first stirred with water, after which the major part of the water is separated off mechanically and the pasty material is compressed, whereupon compaction takes place. It is heated simultaneously or subsequently to 120°–250° C., the remaining water completely evaporating and the binder hardening or vulcanizing.

H packings are manufactured on calenders for rubber-asbestos materials. The components A, B and, if required, D are mixed on a roll mill or in a kneader, together with a solution of component C, after which films are rolled on heated calenders, the solvent evaporating. A plurality of these films can be combined to give the desired thickness, which is preferably from 0.4 to 4 mm. The sheet-like material can be further processed to packings, for example by punching.

The packings can be employed as flat packings, for example as cylinder head gaskets in the automotive sector or as flat packings in apparatus construction.

In the Examples which follow, parts and percentages are by weight.

EXAMPLE 1

3 parts of PVC fibrids which have been modified with 12% of cement and have a freeness of 52°SR are dispersed in 1000 parts of water, while stirring. 70 parts of melamine resin fibers having a mean length of 6 mm and a thickness of from 13 to 20 mm are added after 3 minutes, 10 parts of Portland cement and 10 parts of talc are added after a further 5 minutes, and 14 parts of an 80% strength aqueous natural rubber latex are then introduced. Stirring is continued for 10 minutes after which the dispersion is allowed to settle out, and the major part of the water is removed mechanically by pouring off and pressing. The pastry material is pressed for 15 minutes in a 250×130×1.3 mm mold under a pressure of 150 bar and then heated at 200° C. until the water has been completely removed.

The resulting packing sheet is 1.3 mm thick. A compressive creep test as carried out in accordance with DIN 52,913. When the sample was subjected to a load of 500 kp.cm$^{-2}$, the thickness of the sample after removal of the load was 1.22 mm.

The following further properties were measured:
(a) gas permeabillity: 0.08 cm$^3$/min
(b) compressive creep strength: 32N/mm$^2$
(c) compressibility: 9%
(d) resilience: 55%
(e) heat resistance: 200° C.
(f) swelling: 9%

EXAMPLE 2

The procedure described in Example 1 is followed, except that a mixture having the following composition is prepared:
0.5% of PVC fibrids,
70% of melamine resin fibers,
20% of cement and
9.5% of rubber.

EXAMPLE 3

5 parts of polyethylene fibrids which have been modified with 15 parts of cement and have a freeness of 32°SR are dispersed in 1000 parts of water. The polyethylene has a density of 0.96 g/cm$^3$ and a melt flow index of 5. After dispersing has been carried out for 5 minutes, 80 parts of melamine resin fibers having a mean length of 6 mm and a mean diameter of 15 μm are added. After the mixture has been stirred for another 5 minutes, 20 parts of Portland cement are added, followed by 12 parts of an 80% strength aqueous natural rubber latex as a binder. Mixing is carried out for a further 10 minutes, after which the major part of the water is removed by pressing. The resulting pasty material is introduced into a 250×130×1.5 mm mold and is pressed for 15 minutes under 150 bar and then heated at 200° C.

The packing sheet obtained is 1.4 mm thick. A compressive creep test was carried out in accordance with DIN 52,913. When the sample was subjected to a load of 500 kp/cm², the thickness of the sample after removal of the load was 1.31 mm.

We claim:

1. A sheet-like packing material which consists of
   A. from 2 to 90% by weight of plastic fibers and/or plastic fibrids,
   B. from 5 to 90% by weight of finely divided inorganic fillers,
   C. from 2 to 40% by weight of organic binders and
   D. from 0.1 to 50% by weight of thermoplastic fibrids, the percentages summing to 100 and which has
   (a) a gas permeability according to DIN 3535 of less than 1.0 cm³/min,
   (b) a compressive creep strength according to DIN 52,913 which is greater than 10N/mm²,
   (c) a compressibility according to ASTM F36 of from 3 to 25%,
   (d) a resilience according to ASTM F36 of from 30 to 80% and
   (e) swelling according to ASTM F146 of less than 15%, wherein the plastic fibers or plastic fibrids consist of a melamine resin or of a phenol resin.

2. A packing material as claimed in claim 1, which contains from 0.1 to 50% by weight of fibrids D consisting of a thermoplastic polymer, in particular polyvinyl chloride, polystyrene, polyethylene, polypropylene, nylon, a polyamideimide, a polyester or polyacrylonitrile.

3. A packing material as claimed in claim 1, which contains melamine resin fibers or phenol resin fibers having a BET specific surface area of less than 2 m².g⁻¹.

4. A packing material as claimed in claim 1, which contains melamine resin fibrids or phenol resin fibrids having a BET specific surface area of not less than 5 m².g⁻¹.

5. A process for the production of a packing material as claimed in claim 1, wherein the components A, B and, if required, D, in the form of solids, and component C, as an aqueous dispersion, are stirred with water, the major part of the water is separated off mechanically, and the material is pressed, and heated at from 120° to 250° C.

6. A process for the production of a packing material as claimed in claim 1, wherein the components A, B and, if required, D, are mixed on a roll mill or in a kneader, together with a solution of the component C, the mixture is rolled on a calender to give a film, the solvent being evaporated, and the material is brought to the desired thickness by combining a plurality of films.

* * * * *